July 14, 1931.  O. L. SANDERS  1,814,607
POWER STORAGE AND TRANSMISSION MECHANISM
Filed Jan. 18, 1929  3 Sheets-Sheet 1
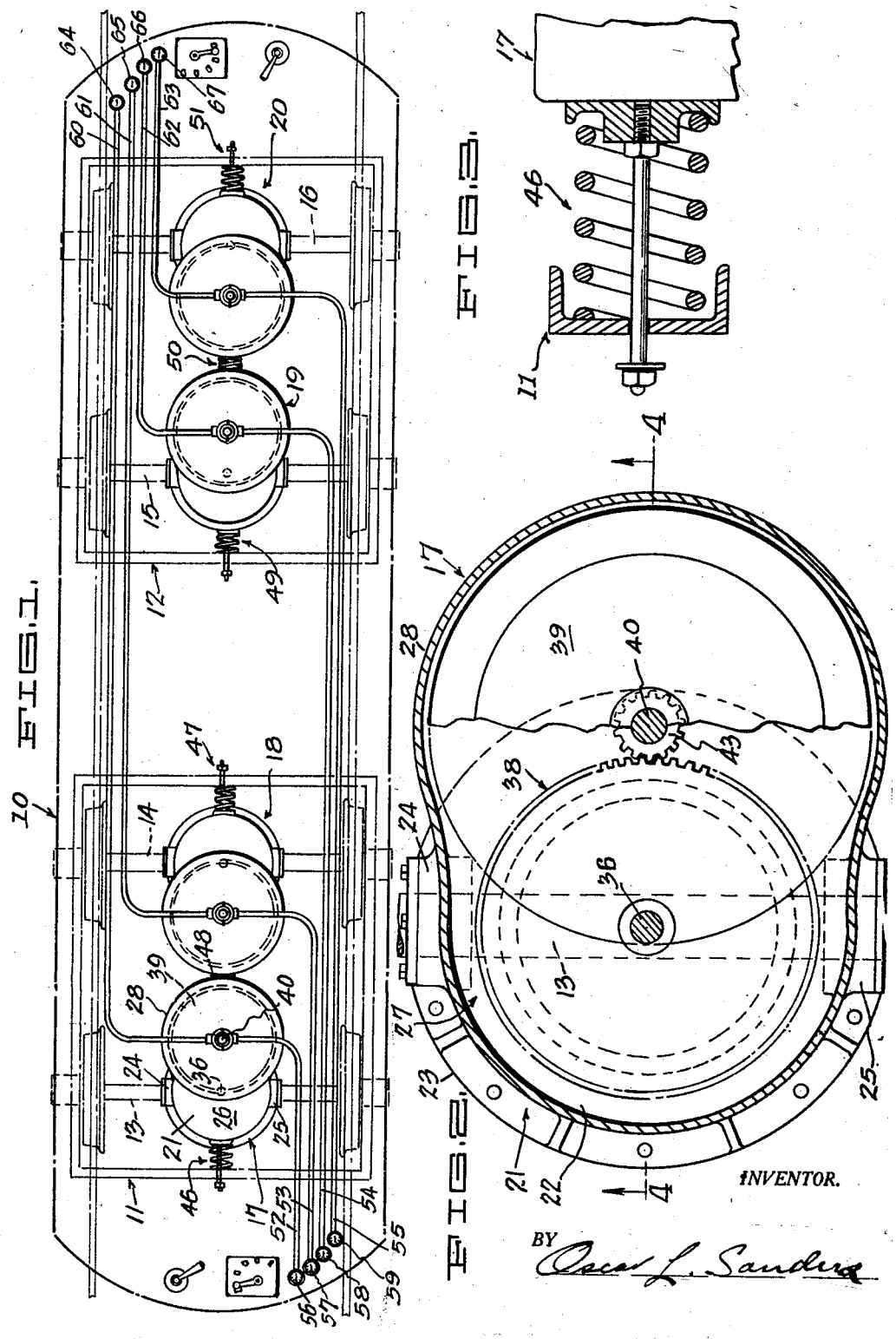
INVENTOR.
BY Oscar L. Sanders

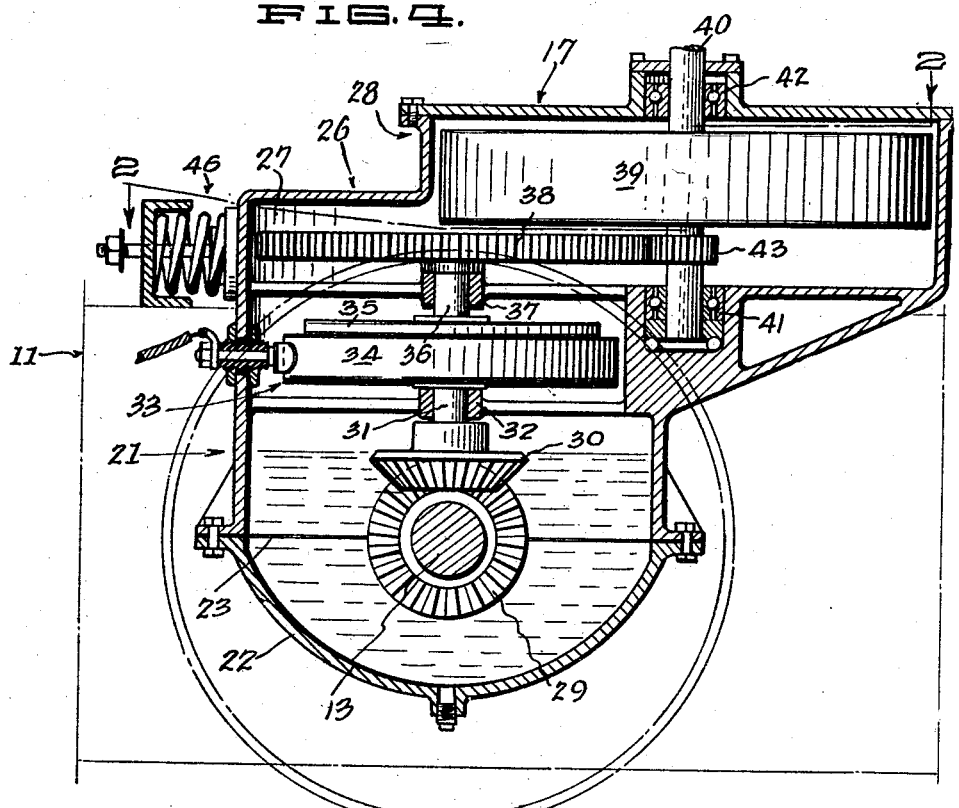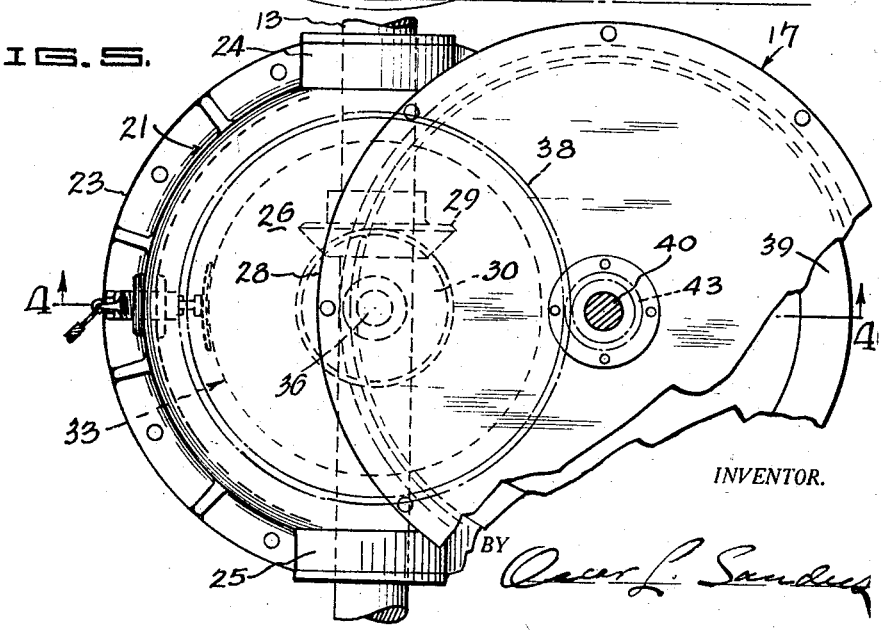

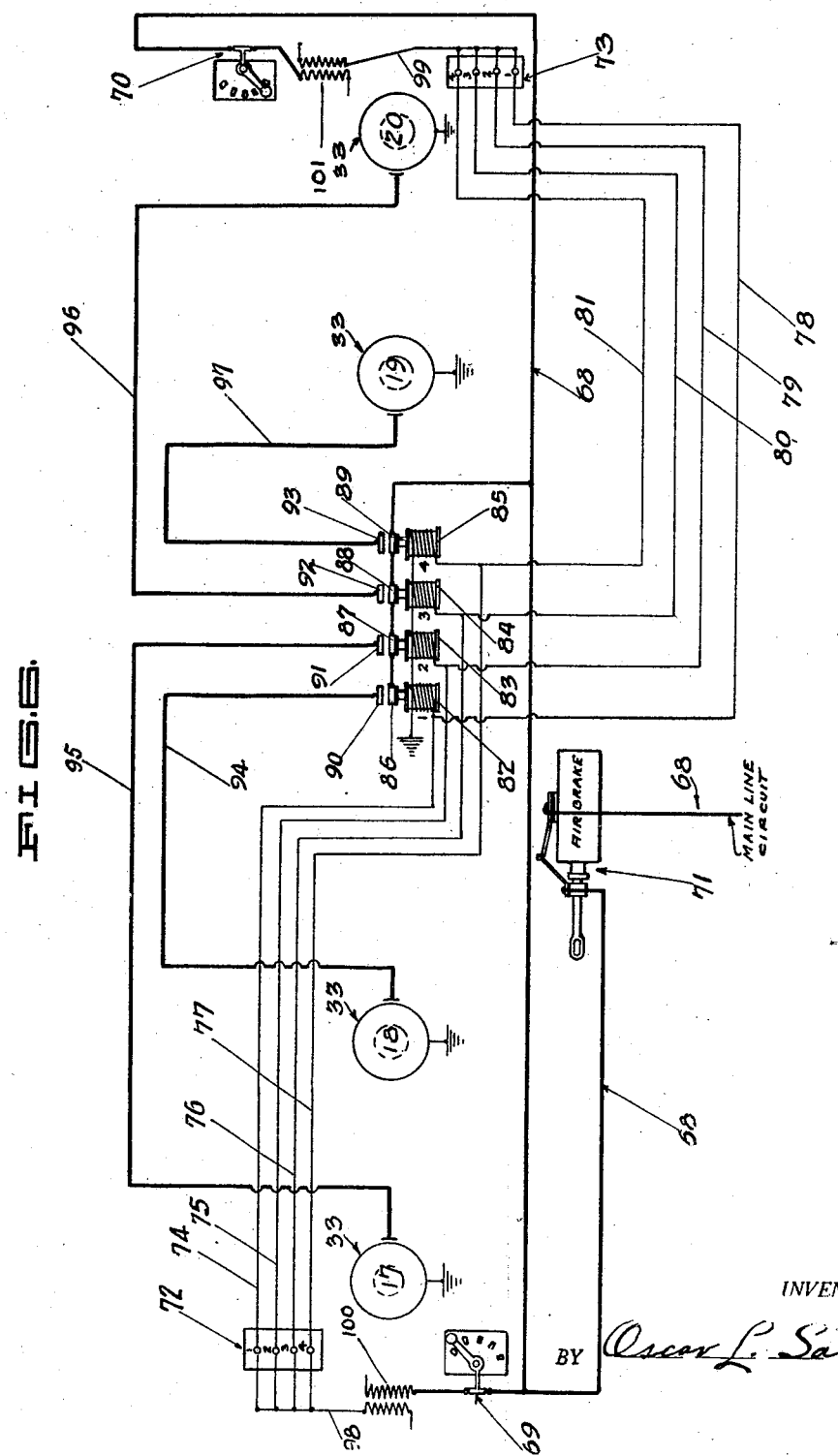

Patented July 14, 1931

1,814,607

UNITED STATES PATENT OFFICE

OSCAR L. SANDERS, OF SAN FRANCISCO, CALIFORNIA

POWER STORAGE AND TRANSMISSION MECHANISM

Application filed January 18, 1929. Serial No. 333,506.

The present invention relates to new and useful improvements in power storage and transmission mechanism, such as that power generated by the axles of vehicles when idling, or coasting down grade, and, in a broad sense, includes apparatus of the type designated which may be applied to any power driven vehicle, such as electric street-railway cars and motor vehicles.

It is obvious that a great deal of power is wasted in handling street cars and motor vehicles in cities, due to the fact that between stops excessive driving power is generally applied to the driving mechanism to acquire suitable velocity in a limited space, and, when this desired velocity has been attained and the motive power shut off, a certain measure of driving torque is still being exerted by the driving axles due to the momentum gained by the vehicle, this power being entirely wasted in general practise.

My improved system for the utilization of this wasted power embodies, in a broad sense, one or more rotatable elements in the form of rotors, so arranged and associated with the vehicle axles that they may be selectively or collectively connected thereto and operated at given intervals, through clutch and gear connections, to utilize the momentum, or driving torque, exerted by the idling axles, when the driving power has been shut off, the power thus utilized being stored up by the rotors for subsequent use in starting the vehicle.

The primary object of my invention is to provide an efficient power storing and distributing system for power driven vehicles which is selective in operation, positive in action, and that will effectually utilize wasted power for retransmission to the driving axles, which is exerted by the idling of these axles when coasting.

Another object of the invention is the provision of a power system of the type designated that may be used for braking purposes to reduce the momentum of the vehicle while at the same time storing, for future use, the wasted power as derived from the idling parts thereof.

Still another object of the invention is the provision of a power utilization and retransmission system of the type designated that is comparatively simple in construction and operation, is strong and durable, and that may be easily controlled by the operator of the vehicle.

The invention possesses other objects and features of advantage, some of which, with the foregoing will be set forth in the following description of the preferred form of my invention which is illustrated in the accompanying drawings and forming part of the specification. It is to be understood that I do not limit myself to the showing made by the said drawings and description, as I may adopt variations of the preferred form within the scope of my invention as set forth in the claims.

In the accompanying drawings:

Figure 1 is a schematic plan view illustrating my improved power system as applied to the driving axles of an electric railway car and showing a plurality of power storing and retransmission units in co-operative association therewith;

Figure 2 is an enlarged horizontal sectional view of one of the power units as indicated by the line 2—2 in Figure 4;

Figure 3 is a sectional detail of a spring buffer for use in pairs on opposite sides of each unit to maintain the same in upright position in the truck frames;

Figure 4 is a vertical sectional detail of one of the power units mounted upon a driving axle of the vehicle and showing the driving connections and clutch mechanism between the axle and rotor, the section being indicated by the line 4—4 in Figures 2 and 5;

Figure 5 is a plan view of one of the units with sections broken away to disclose interior parts; and Figure 6 is a wiring diagram illustrating one method of electrically connecting the various clutch elements into a main line circuit for their collective, or selective, actuation.

Referring to the drawings in detail and in particular to Figure 1, in which an embodiment of my invention has been illustrated, the numeral 10 designates a dot-anddash outline of a street railway car having the usual truck frames 11 and 12 provided, respectively, with the usual axles 13, 14, 15 and 16.

A plurality of power transmission units 17, 18, 19 and 20 are associated with the axles 13, 14, 15 and 16, and are geared thereto for selective, or collective, actuation through the medium of clutches controllable by means of an electrical circuit, as hereinafter set forth.

One of the units 17 is illustrated in detail in Figures 2, 4, and 5, and as all the units are substantially of duplicate construction this one only will be described in detail. Said unit 17 consists of a gear housing 21 provided with a cap member 22 bolted thereto at the horizontal parting line 23 thereof, the upper and lower halves of the housing providing axially aligned bearing boxes 24 and 25 through which the axle 13 extends to provide a support for the entire unit, as shown in Figure 4.

The upper portion of the housing 21 is provided with an offset section 26 embodying a gear case 27 and a communicating rotor chamber 28. A bevel gear 29 is rigidly keyed upon the axle 13 and constantly meshes with a like bevel gear 30 carried by a vertically disposed shaft 31, said shaft being mounted in a bearing member 32 formed centrally in the housing 21.

A clutch 33 is fixed upon the upper end of the shaft 31 and embodies the elements 34 and 35 and is preferably of the magnetic type controllable through an electrical circuit to cause the engagement and disengagement of the elements 34 and 35. The element 35 is carried by a shaft 36 positioned in axial alignment with the shaft 31 and said shaft 36 is journalled in a suitable bearing 37 and having its upper end provided with a comparatively large gear 38 adapted for rotation in the gear case 27.

The rotor 39 should be a comparatively heavy element although it may be of any suitable size and weight to suit its particular application. The rotor 39 is mounted in the chamber 28 and is borne by a vertically disposed shaft 40 which in turn is journalled in suitable anti-friction bearings 41 and 42, as clearly shown in Figure 4. The shaft 40 carries a pinion 43 which is arranged to mesh with the large driving gear 38 above described, the ratios of these gears being determined by actual practise.

The units 17, 18, 19 and 20 are independently mounted upon their respective axles 13, 14, 15 and 16 and are held in upright positions in the truck frames 11 and 12 by means of spring buffer members 46, 47, 48, 49, 50 and 51, the members 46, 47, 49 and 51 being anchored to the frames and the members 48 and 50 being arranged between the units 17, 18, 19 and 20, so as to compensate for any irregular movements of the car axles due to irregularities in the railway tracks.

A plurality of flexible connections 52, 53, 54 and 55 are suitably connected to the rotor shafts 40 of each unit and are led to the front end of the car and these lines are each provided with a speed indicator 56, 57, 58 and 59, and similar lines 60, 61, 62 and 63 are connected to each rotor shaft and led to the rear of the car and are provided with speed indicators 64, 65, 66 and 67, so that the operator of the car may tell at a glance the exact velocity at which any given rotor is functioning.

The electrical diagram illustrated in Figure 6 shows a method by which the various magnetic clutches of the units 17, 18, 19 and 20 may be selectively, or collectively, controlled and operated by means of various switches, as hereinafter set forth.

The main line circuit 68 may be any suitable electric circuit, and, as here shown, includes controller switches 69 and 70 controllable to make or break the circuit at either end of the car, said circuit being normally closed when the motor controllers are deenergized and open when either controller is operated, as in starting the car motors.

An air brake switch 71 is also cut into the circuit 68 and breaks this circuit whenever the air brakes are applied, so that none of the unit clutches can be energized if any of the driving motors are energized or during the intervals in which the air brakes are in operation.

Push button switches 72 and 73 are mounted at each end of the car and comprise four push buttons electrically connected by lines 74, 75, 76 and 77 and lines 78, 79, 80 and 81, respectively, to solenoids 82, 83, 84 and 85 having movable contacts 86, 87, 88 and 89 connected in series to the main circuit 68.

Fixed contact points 90, 91, 92 and 93 are arranged in close proximity to the movable contact points 86, 87, 88 and 89 and close the clutch circuits 94, 95, 96 and 97 either selectively or collectively when the push buttons of either switch 72 or 73 are manipulated. The lines 98 and 99 connecting the push button switches 72 and 73 are energized preferably through the medium of transformers 100 and 101 connected into the main line circuit 68, which circuit would be a high voltage circuit controllable through the controller switches 69 and 70, as hereinbefore described.

Driving force is transmitted from the axles to the rotors at all times during the idling thereof, except, of course, during the operation of the air brakes, which application of the air brakes causes the circuit to be broken through the switch 71. The rotors continue to rotate at high speed when the clutches are deenergized, due to the momentum stored thereby during the periods of operative connection with the axles. When it is desired to apply this power in starting the car the momentum stored by any selected rotor may be retransmitted to its particular axle by the release of the air brakes and the closing of the circuit 68 through the switch 71 and controller switches 69 and 70.

It is obvious from the foregoing description that in starting the rotors from a dead stop it will be necessary for some slippage to take place, at least until the rotors have attained considerable momentum, this slippage being absorbed by the magnetic clutches which should be so arranged as to compensate for the variable speeds between the rotors and axles, so that jerks and sudden shocks will not be transmitted from the axles to the rotors and vice versa.

The gear housing 21 may be partially filled with oil, as shown in Figure 4, to keep the running parts, and especially the bevel gears 29 and 30 thoroughly lubricated at all times to reduce friction and noise occasioned by the operation of these elements.

The rotors may be varied in size and weight depending upon the size and weight of the vehicle to which they are applied, or the gear ratios of the several rotors may be varied so that four different speeds may be transmitted to the car axles, if desired. For instance, rotor 17 may be arranged to operate at slow speed and the gear ratios of rotors 18, 19 and 20 may be accordingly graduated to cause each successive rotor to function at a higher velocity, so that any desired speed may be selected by the operator and retransmitted to the car axles. The proper arrangement of these elements depending, of course, upon the load and starting torque required in starting the vehicle.

If rotor 17 is geared low and rotates at slower speed than the next succeeding rotor the operator would first actuate push button No. 2; then No. 1; then No. 4 and finally No. 3, the rotors to be selected depending entirely upon operating conditions.

I claim and desire to secure by Letters Patent of the United States, the following:

1. In mechanism of the class described, a driving axle, a power unit carried by said axle and embodying a housing, a rotor journalled in said housing, driving connections between said rotor and the driving axle and including a clutch, said clutch being of the magnetic type and included in an electrical circuit, means associated with said circuit to cause the functioning of said clutch to connect said rotor and said axle to acquire momentum from said axle when said axle is idling, and means for the retransmission to said axle of the momentum stored by said rotor.

2. In mechanism of the class described, a driving axle, a reserve power unit carried by said axle and embodying a housing, a rotor journalled in said housing, driving connections between said rotor and the driving axle, a magnetic clutch between said axle and rotor, and electrical actuating means associated with said clutch and adapted to cause the operation thereof to drive the rotor while said axle is idling.

3. In mechanism of the class described, the combination with a power propelled vehicle, means associated with the driving axles thereof to cause the storing of momentum due to the idling of said axles when the power is shut off, and means for the retransmission of said stored momentum to said axles for starting purposes.

4. In mechanism of the class described, a power driven axle, a reserve power unit including a rotor, driving connections between said axle and said rotor for driving the rotor from the axle, a clutch between said axle and rotor, means for operating said clutch to drive the rotor when said axle is idling, and means whereby said clutch is rendered inoperative when said axle is being driven.

5. In mechanism of the class described, an electrically driven axle, a reserve power unit including a rotor, driving connections between said axle and said rotor whereby the latter may be driven, a magnetic clutch between said axle and said rotor, means for energizing said clutch to drive the rotor when said axle is idling and means whereby said energizing means is rendered inoperative when said axle is driven.

6. In mechanism of the class described, a plurality of driving axles, a reserve power unit carried by each of said axles, each of said units comprising a rotor, driving connections between each of said rotors and its driving axle, a clutch between each of said axles and its respective rotor and an electrical actuating means associated with each of said clutches and adapted to cause the operation thereof to drive the rotor when its axle is idling, and means for the retransmission to each of said axles of the momentum stored by said rotor.

In testimony whereof I have affixed my signature.

OSCAR L. SANDERS.